US009613155B2

(12) United States Patent  
Hill et al.

(10) Patent No.: US 9,613,155 B2
(45) Date of Patent: Apr. 4, 2017

(54) SYSTEM AND FRAMEWORK FOR MULTI-DIMENSIONALLY VISUALIZING AND INTERACTING WITH LARGE DATA SETS

(71) Applicant: The Trustees of the Stevens Institute of Technology, Hoboken, NJ (US)

(72) Inventors: Cameron Wesley Hill, Hoboken, NJ (US); Kevin Michael Barresi, Little Silver, NJ (US); Mukundan Iyengar, Jersey City, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 243 days.

(21) Appl. No.: 14/335,173

(22) Filed: Jul. 18, 2014

(65) Prior Publication Data

US 2015/0026606 A1    Jan. 22, 2015

Related U.S. Application Data

(60) Provisional application No. 61/856,216, filed on Jul. 19, 2013.

(51) Int. Cl.
*G06F 3/00* (2006.01)
*G06F 17/30* (2006.01)
*G06F 3/0482* (2013.01)
*G06F 3/0481* (2013.01)

(52) U.S. Cl.
CPC ........ *G06F 17/3089* (2013.01); *G06F 3/0482* (2013.01); *G06F 3/04817* (2013.01); *G06F 17/3087* (2013.01)

(58) Field of Classification Search
CPC .......................... G06F 17/3087; G06F 3/04817
USPC ......................................................... 715/760
See application file for complete search history.

(56) References Cited

U.S. PATENT DOCUMENTS

| | | | |
|---|---|---|---|
| 6,789,077 B1* | 9/2004 | Slaughter | G06F 9/465 |
| 8,200,617 B2* | 6/2012 | Spivack | G06F 17/3087 707/602 |
| 8,427,510 B1* | 4/2013 | Towfiq | G09G 5/391 345/654 |
| 8,786,845 B2* | 7/2014 | Lynch | G01C 21/32 356/139.01 |
| 2008/0140688 A1* | 6/2008 | Clayton | G06Q 10/06 |

(Continued)

OTHER PUBLICATIONS

Sparck Jones, K. "A statistical interpreation of term specificity and its application in retrieval", Journal of Documentation, vol. 28 Iss: 1, (1972) pp. 11-21.

(Continued)

*Primary Examiner* — William Titcomb
(74) *Attorney, Agent, or Firm* — Greenberg Traurig, LLP

(57) ABSTRACT

An apparatus and method for accessing and controlling data has a computer coupled to a display screen and to a source of a plurality of data items. The computer is programmed with a program having a graphical user interface that displays symbols on the display screen that represent the data items. The symbols may be displayed and colored in groups based upon the similarity of content of the data that the symbols represent. The content may also generate labels for the symbols. Lines extending between symbols graphically indicate the relatedness of the data that the symbols represent and the size of symbols may indicate the calculated relevance to user interests.

28 Claims, 11 Drawing Sheets

(56) References Cited

U.S. PATENT DOCUMENTS

| | | | | |
|---|---|---|---|---|
| 2009/0192898 A1* | 7/2009 | Baril | ................... | G06Q 20/204 705/14.64 |
| 2009/0327953 A1* | 12/2009 | Honkala | ............. | G06F 3/04817 715/804 |
| 2011/0214050 A1* | 9/2011 | Stambaugh | ......... | G06F 3/04817 715/234 |
| 2013/0185648 A1* | 7/2013 | Kim | ........................ | G06F 3/048 715/744 |

OTHER PUBLICATIONS

Deerwester, S. et al., "Indexing by latent semantic analysis", Journal of the American Society for Information Science, 41(6), (1990), 391-407.

Salton, G. et al., "A vector space model for automatic indexing." Communications of the ACM 18.11 (1975): 613-620.

Fruchterman, T. et al., Graph drawing by force-directed placement. Software: Practice and experience, 21(11), (1991), 1129-1164.

Bezdek, J. et al., FCM: The fuzzy c-means clustering algorithm. Computers & Geosciences, 10(2), (1984) 191-203.

The Opte Project., Retrieved Apr. 13, 2016, from http://opte.org/.

Data Mining: Mapping the Blogosphere. Retrieved Apr. 13, 2016, from http://datamining.typead.com/gallery/blog-map-gallery.html.

LivePlasma Discovery Engine, Retrieved Apr. 13, 2016, from http://www.liveplasma.com.

WikiMindMap. Retrieved Apr. 13, 2016, from http://www,wikimindmap.org/viewmap.php?wiki=en.wikipedia.org&topic=patent.

Manning, C., et al., Document and query weighting schemes. Introduction to Information Retrieval. HTML edition (2009) p. 118, Cambridge University Press, Cambridge.

Determinging the number of clusters in a data set. Retrieved May 27, 2016. URL: https://en.wikipedia.org/wiki/Determining_the_number_of_clusters_in_a_data_set#cite_ref-1.

Chiang, M. et al., Intelligent Choice of the Number of Clusters in K-Means Clustering: An Experimental Study with Different Cluster Spreads. Journal of Classification 27 (2009).

Goutte, C. et al., On Clustering fMRI Time Series. Department of Mathematical Modelling, Technical University of Denmark, and The Danish Research Centre for Magnetic Resonance (1998).

Sugar, C. et al., Finding the Number of Clusters in a Dataset: An Information-Theoretic Approach, Journal of the American Statistical Association, vol. 98, No. 463, (Sep. 2003), pp. 750-763.

* cited by examiner

FIG. 2

SYSTEM AND FRAMEWORK FOR MULTI-DIMENSIONALLY VISUALIZING AND INTERACTING WITH LARGE DATA SETS

CROSS-REFERENCE TO RELATED APPLICATIONS

The present application claims the benefit of U.S. Provisional Application No. 61/856,216, filed on Jul. 19, 2013, entitled, System and Framework for Multi-Dimensionally Visualizing and Interacting with Large Data Sets, the disclosure of which is incorporated herein by reference in its entirety for all purposes.

FIELD

The present invention relates to graphical user interfaces, data representation and data browser programs that facilitate viewing, organizing, and interacting with a vast pool of data on a computer screen, and more particularly, to programs and methodology which facilitate browsing data from sources on the Internet or a local area network (LAN), such as web-pages and data-servers, or data residing on mass storage devices such as an internet or external hard-disk drives or mass-media memory chips connected to a display terminal.

BACKGROUND

Known methods for harnessing the vast pool of data present on the Internet include approaches to create static website connection maps (Opte) (http://opte.org/), mapping blogging content ("Data Mining: Mapping the Blogosphere", http://datamining.typepad.com/gallery/blog-map-gallery.html, visualizations of related music (LivePlasma, http://www.liveplasma.com/, which suggests music for the user to listen to), and mapping of related Wikipedia page links (WikiMindMap, http://www.wikimindmap.org/).

Content aggregating websites that find content and export a linear list of hyperlinks to the user are known. Examples include search engines, e.g., Google, Bing, Yahoo Search, etc., as well as portals that display news articles aggregated from various Internet sources, e.g., Google News, Yahoo News, etc. This approach has also been extended to portals that display user-generated content, e.g., Reddit, Facebook, Twitter, etc.

Notwithstanding the foregoing known methods, improved and/or alternative methods and apparatus for accessing and managing data that is available either on the Internet or on mass storage devices such as hard-drives, data-servers, or other mass storage devices connected to a computer display terminal remain desirable.

SUMMARY

The disclosed subject matter relates to an apparatus for accessing and controlling data, having a computer coupled to a display screen and to a source of a plurality of data items. The computer is programmed with a program having a graphical user interface that displays symbols on the display screen that represent the data items.

In one approach, the symbols are displayed in groups based upon the similarity of content of the data that the symbols represent.

In another approach, lines extending between symbols graphically indicate the relatedness of the data that the symbols represent.

In another approach, the relatedness indicated by the lines is shown by the thickness of the lines.

In another approach, the source of the data items is the Internet.

In another approach, the data items are obtained from websites on the Internet.

In another approach, the data items are obtained from data servers on a network, such as local area networks (LANs), or wide area networks (WANs), such as the Internet.

In another approach, the source of data items are mass storage devices that can be accessed locally without the need to connect to a network, such as external or internal hard-disk drives, internal or external memory devices, compact-disk drives, or other such peripheral mass storage devices.

In another approach, the symbols are automatically generated by the program on each entry of a URL of a website on the Internet.

In another approach, the symbols are automatically generated by the program on selection of a hyperlink.

In another approach, the number of uses of a given data item is represented at least partially by the size of the symbol.

In another approach, the size of the symbol is representative of the symbol's relevance of the symbol to the user's interests.

In another approach, the size of the symbol is representative of the symbol's relative importance to a user based on temporal or spatial locality observed from browsing patterns.

In another approach, symbols can be selected and the data associated with a given symbol is displayed in response to the selection.

In another approach, symbols can be dragged and dropped to adjust the display of symbols to a user's preferences.

In another approach, the symbols are in the form of bubbles.

In another approach, a user can express an explicit interest in the contents of a page. Such an interest can be expressed by means of a "love content" button.

In another approach, the system reorganizes symbols to make apparent content that a user likes. This is done via color coding bubbles, sizing bubbles or bubble placement.

In another approach, symbols are automatically named based upon the content of the associated data.

In another approach, groups of symbols are automatically named based upon the content of the associated data.

In another approach, the symbols can be viewed at a plurality of levels of magnification (zoom).

In another approach, the relatedness of given data items is represented at least partially by the colors of the symbols that represent them.

In another approach, the symbols are used as a graphical user interface for a browser.

In another approach, the symbols can be deleted by the user.

In another approach, the plurality of magnification levels implies a variable displacement of the symbols relative to the plane of the display, representing a third dimension.

In another approach, the symbols may be displayed at different sizes implying a variable displacement of the symbols relative to the plane of the display, representing a third dimension.

In another approach, related symbols organized as a group are called a "bubblespace"

In another approach, the bubblespace can be dragged, interacted with, expanded and collapsed into various views.

In another approach, the visualization consists of a panel which can hold bubbles currently interacted with.

In another approach, a symbol or bubble can be loaded onto the panel by means of interaction.

In another approach, an entire bubble-space, which is a group of bubbles, can be simultaneously loaded onto the panel.

In another approach, interaction can switch between a group of currently loaded bubbles to another group of separate bubbles in one interaction.

In another approach, the system allows users to spawn new data points, or bubbles, at will to interact with new content.

In another approach, the system maintains information about various "sessions," a session being the sequence of activities performed from the time a user starts interacting with the program until the user quits the program.

In another approach, the system maintains continuity between sessions. The system presents to the user activities from the previous session upon restart.

In another approach, a collection of symbols from the previous session is a new group that is made visible to the user.

In another approach, a user can drag a symbol from one group to another group, thereby removing the symbol from the former group and adding it to the latter.

In another approach, the user can spawn new groups to organize bubbles at will.

In another approach, the user can drag bubbles from an existing group, or from a previous session, to new groups.

In another approach, a method for representing data in a graphical user interface displayed to a user on a display screen of a computing device with access to a plurality of data items, includes displaying graphical symbols on the display screen that represent the data items accessed by a user, the symbols being displayed in groups based upon a grouping criteria, including at least one of similarity of content of the data that the symbols represent, categorization by the user and viewing by the viewer in a prior session of use of the computing device, the relationship of the groups of data items being expressed by at least one of lines between the symbols, coloration of the symbols and a grouping symbol having a boundary extending around the symbols in a group; naming the symbols and groups of symbols; displaying the name of the symbols and groups of symbols proximate the symbols and groups of symbols, respectively; ranking the symbols; and expressing the rank of the symbols and the data that they represent based upon a ranking criteria of at least one of frequency of access and ascribed importance by the user, the ranking of symbols capable of being expressed graphically by at least one of size of the symbol, position of the symbol and color of the symbol, the graphical user interface capable of presenting data content associated with a symbol of the plurality of symbols upon selection of the symbol by the user.

In another approach, the method includes providing the user with the capability of selectively dragging and dropping symbols to positions on the display in accordance with the user's preferences, including dragging a symbol from one group and dropping the symbol in another group, dragging and dropping groups of symbols, adding and deleting symbols and groups of symbols, viewing thumbnail representations of data associated with symbols, and wherein the symbols represent data items that are obtained from websites on the Internet, the symbols being automatically generated, named and displayed on the graphical user interface when accessing a website on the Internet.

In another approach, a graphical user interface displayed to a user on a display screen of a computing device coupled to a source of a plurality of data items features a plurality of symbols displayed on the display screen that represent a plurality of data items, the symbols capable of being displayed in groups based upon a grouping criteria, including at least one of similarity of content of the data that the symbols represent, categorization by the user and viewing by the viewer in a prior session of use of the computing device, the relationship of the groups of data items being expressed by at least one of lines between the symbols, coloration of the symbols and a grouping symbol having a boundary extending around the symbols in a group. The symbols and groups of symbols have names displayed proximate the symbols and groups of symbols, allowing a user to identify the data associated with the symbols and groups of symbols, the symbols having a ranking based upon a ranking criteria of at least one of frequency of access and ascribed importance by the user, the ranking of symbols capable of being expressed graphically by at least one of size of the symbol, position of the symbol and color of the symbol, the graphical user interface capable of presenting data content associated with a symbol of the plurality of symbols upon selection of the symbol by the user, the graphical user interface providing the user with the capability of selectively dragging and dropping symbols to positions on the display in accordance with the user's preferences, including dragging a symbol from one group and dropping the symbol in another group, dragging and dropping groups of symbols, adding and deleting symbols and groups of symbols, viewing thumbnail representations of data associated with symbols, the symbols representing data items and being automatically generated, named and displayed on the graphical user interface when accessing the data item.

BRIEF DESCRIPTION OF THE DRAWINGS

For a more complete understanding of the present disclosure, reference is made to the following detailed description of exemplary embodiments considered in conjunction with the accompanying drawings.

FIG. 2 is screenshot of a webpage displaying data content.

FIG. 5 is a screenshot of a panel that holds bubbles that are being interacted with.

DETAILED DESCRIPTION OF EXEMPLARY EMBODIMENTS

Figure 1:
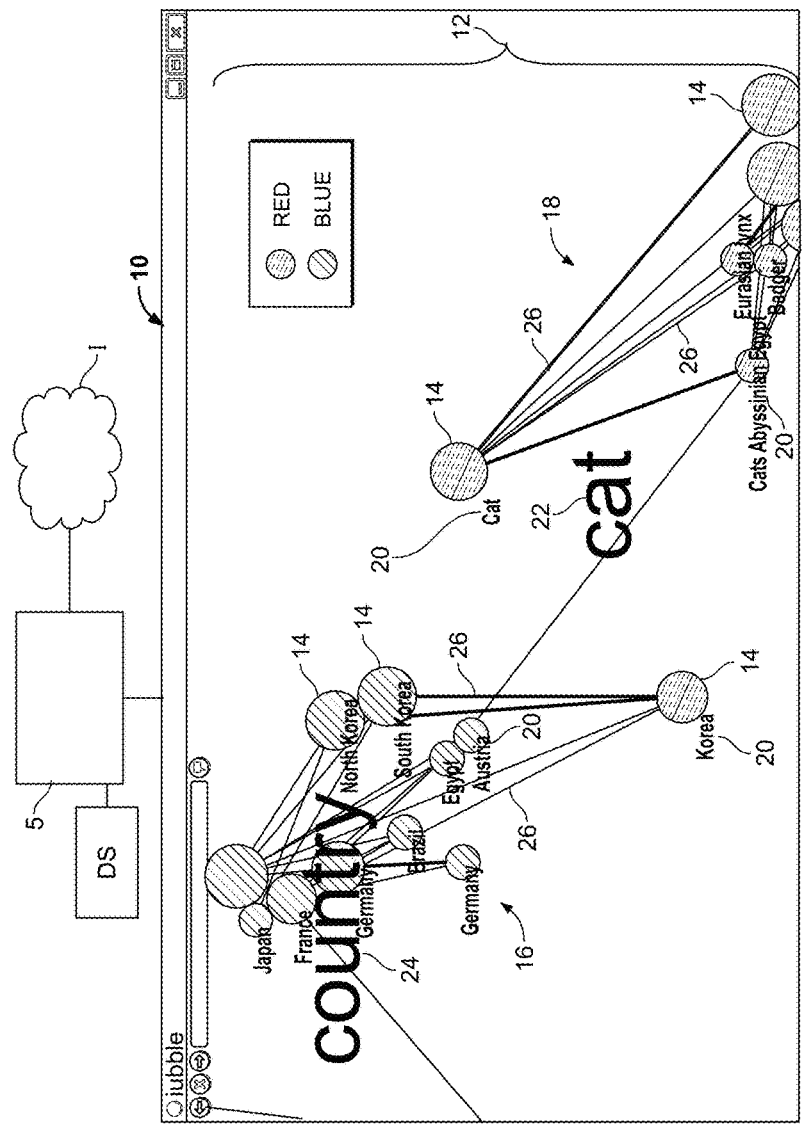
FIG. 1 is a screenshot of a computer display generated in accordance with an embodiment of the present disclosure.

An aspect of the present disclosure is the recognition of the limitations of known to technology that treats web-pages and their content as individual entities. More particularly, browsers load a URL onto a webpage as a singleton, and outgoing links on a page are clicked upon to reload a given page with a new URL. Users may open new "tabs" for interesting outgoing links. Browsing the Internet using a plethora of tabs places the onus on the user to imagine, visualize and synthesize the various interconnections between online content. As a result, browsing is an inherently linear experience. It is linear because the user navigates content and outgoing links by "scrolling" the webpage from top to bottom. This linear approach also applies to searching (search results are linear, top-down links), interacting with social media content, or reading news articles, to name a few examples. Furthermore, it applies to the method of transitioning from page to page; in order for the user to navigate from web-page 'A' to web-page 'B', a series of intermediary web-pages must be visited. As a result, present day browsing forces a user to interact linearly with web-content. This linear view gives the user "tunnel vision", that is, they can only see what is presented at their current browser level.

The present disclosure also recognizes that known browsers are wasteful of screen real estate. This is due in part to the standard 16:9 aspect ratios of screens and by the placement of content in the middle of the screen for better view ability. In fact, a large majority of web-pages leave two panels blank and content free, i.e., one panel each on the left and right hand side of a browser. As a result, a browser that occupies a whole screen can only fit content from one site, while still wasting a substantial portion of screen real estate.

The present disclosure also recognizes that the known process for bookmarking content for later consumption is cumbersome. While most browsers allow users to save and organize bookmarks into various folders, it is almost impossible to view all bookmarks in an intuitive view in one screen to identify the relevant links at a future date. Also, most users end up losing bookmarks they made at another terminal/device for a variety of reasons. Another issue is that deciding which websites to bookmark can be burdensome, in that the user must constantly be making and implementing judgments as to what is important enough to bookmark and what is not.

The present disclosure relates to a new method for, and an improvement to, the process of browsing large sets of data. One example of a large dataset requiring an intuitive interface is the Internet. The concepts disclosed herein include methods to identify, collect, and organize outgoing links in a webpage and related information from various webpages as interactive and interconnected "bubbles". A "bubble" is a miniature representation of an entire data point (e.g., webpage), and may take various physical shapes to best help a user when interacting with its contents (e.g., circle, ellipse, polygon, representational graphic symbol, etc.). These bubbles are interconnected to each other based upon the relationship of content (e.g., reflect an outgoing link from one webpage to another). A collection of such interconnected bubbles is called a "bubblespace". The bubblespace is a non-linear and infinite browsing space that can grow unbounded in any direction on a 2D plane. The bubblespace organizes content in various sized bubbles, which are additionally color-coded, to help users assimilate and identify the most important information to interact with. A user can zoom-in, zoom-out, drag, and save such a bubblespace to retrieve it at a later time/place.

An immediate use of this invention is to provide a richer, more intuitive and hassle free data browsing experience; including searching, browsing, discovering, organizing, interacting with, and bookmarking content. For example, the method can be universally applied to browse content on any website on the Internet at the time of this writing. This invention can be directly implemented as an Internet browser, and as such, becomes the "window" through which all web content is viewed.

The unified, intuitive and infinitely expandable user-interface provided may have utility for a wide range of industries that have a presence on the world-wide-web, as well as for industries with other data intensive technologies. This includes all major/most-visited portals on the Internet today including search engines (Google, Bing, Yahoo etc.), social media (Facebook, Reddit, Twitter, Flickr etc.), news and aggregation services (Google-news, Yahoo-news, etc.), video streaming portals (YouTube, Hulu, Netflix etc.), photo-sharing portals (Flickr, Picasa etc.) to name a few.

The approach of the present disclosure may be utilized for other applications beyond browsing the Internet, e.g., to interact with apps on smartphones and tablets, where bubbles are miniature versions of the apps themselves. This would allow users to browse, organize, interact-with and discover new apps. Another use of the disclosed technology is an operating system (OS) module to interact with a user's file system. Files and folders in a user's hard-disc drive can be represented as interconnected bubbles. The further possibility of sharing files online could allow users to synchronize or share files across multiple devices, while searching, sorting through, and modifying files on their system.

More generally, the approach of the present disclosure can be utilized by organizations that need to visualize large amounts of data. Due to an intuitive interface and intelligent data presentation methods, the present disclosure has applications in more generic fields of data visualization. As a result, organizations or users with large amounts of data would benefit in using this technology to display their data. Examples include military, academic, and commercial entities.

The present disclosure relates to a system, method and programmed apparatus that addresses the above limitations by presenting a graphical user interface using interconnected graphic symbols, i.e., "bubbles" that shall be described at length below. The displayed bubbles provide a non-linear interface to content by allowing a program defined "bubblespace" to grow unbounded in any direction on a 2D display plane. The resulting browsing experience is no longer linear, as searching spawns new bubbles in different directions, as do outgoing links from a webpage. The user does not scroll linearly to discover information anymore; rather, bubbles are displayed on the bubblespace in a fashion where the user pans vertically and horizontally, as well as, zooming in and out. This effectively results in a three dimensional (3D) browsing experience. As described further below, the coloring and relative sizing of the bubbles are additional optional dimensions of representation, such that the bubblespace could be described as "multi-dimensional."

The bubbles use all of a screen/browser real estate, in that the bubblespace is permitted to grow unbounded. All parts of the visible screen (and beyond) are populated with bubbles as they fill up the screen space. In addition, the system of the present disclosure allows a user to save their bubblespace. This immediately relieves the user of the burden of explicitly bookmarking content or having to organize bookmarks into various folders. The entire bubblespace can be retrieved seamlessly at another device/terminal, where the user is identified by login credentials. The bubblespace is inherently non-linear and visually easy to assimilate, unlike bookmarks within folders where it is nearly impossible to view them all on one screen.

In one embodiment, the present disclosure is embodied in a cross platform desktop application, written in C++, which can be cross compiled for major platforms, such as Windows, Linux, OSX, etc. It uses Qt as the windowing framework, as well as OpenCL for performance critical calculations. Its operations include the following. The original set of data is supplied through the user's existing bookmarks. The content of these bookmarks is then stripped down to the bare URLs and the corresponding web data is prefetched into a local SQL database.

Based on this data, each document (information contained by each element in the set of provided data) is broken down into a list of terms and their corresponding frequency of appearance within that document. A matrix of all these documents and corresponding terms is constructed, commonly known as a document-term matrix. From this document term matrix, unimportant words are filtered out using a term frequency—inverse document frequency scheme ["A statistical interpretation of term specificity and its application in retrieval", Spärck Jones, 1972]. The information available from this publication, and all subsequently mentioned publications and sources noted below are incorporated by reference herein in their entirety. For initial testing, absolute term frequency was used, and a logarithmic inverse document frequency was used, represented by the following equation:

$$idf = \log\left(\frac{N}{df}\right)$$

Where idf is the inverse document frequency, N is the number of documents in the data set, and df is the number of documents that the specific term appears in.

Within this document term matrix, each row now contains a vector representation of the document, and all the words that it contains with their respective frequency. Using Latent Semantic Analysis, the matrix is transposed and multiplied by its original, yielding a square matrix with the number of rows and columns being the number of documents within the data set ["Indexing by latent semantic analysis", Deerwester, 1990]. This matrix represents the dot products between every combination of vectors, which can be used in the common technique known as cosine similarity that results in a single number ranging from negative one to one that represents how similar each document is ["A vector space model for automatic indexing", Salton et al., 1975].

A bubble is then generated for each document, and its size is determined through two factors: the relevance or importance of the document contained within the bubble, and the frequency that the user accesses the information within the bubble.

The initial size of the bubble is determined based upon the number of times that the user has accessed a bubble. The size is found through the following:

$$size = e^{(-\frac{x}{c} + \ln(S_{max} - S_{min}))} + S_{max}$$

Where:
S$_{max}$ and S$_{min}$ represent the desired maximum and minimum sizes of the bubble respectively
X is the number of page visits for that particular bubble above the average number of page visits for all bubbles
C is an experimentally determined constant. It controls the rate of increase of size. The smaller the C value, the faster the size will increase with respect to the number of visits The importance of a single document relative the whole set of documents given can be found through the following formula:

$$I_i = \left(\sum_{k=0}^{j} R_{i,k}\right) - 1$$

Where:
$I_i$ is the importance of the document in row i of the matrix.
$R_{i,k}$ is the relationship between documents in row i and column k of the matrix
j is the number of documents within the data set.

From this importance, I, the scaling factor for the bubble can be determined through the following equation:

$$S_{final} = S_{initial} * C_8 * I^C$$

Where:
S represents the size of the bubble
C is an experimentally determined constant. The larger the value C is, the more size difference there will be between the smallest and the largest bubbles, and a smaller C will result in more uniform bubble sizes.

The bubbles are then placed into the bubblespace using a specialized force directed placement algorithm based off of the Fruchterman-Reingold method ["Graph drawing by force-directed placement", Fruchterman et al., 1991]. To optimize this algorithm for this invention, the ideal distance between nodes/bubbles is determined based upon the relationship between those two bubbles rather than a static distance with the intention of evenly spacing nodes as much as possible. This follows the following equation:

$$K = \frac{\frac{R_1 + R_2}{10}}{\sqrt{Sim}}$$

Where:
K is the ideal distance between two bubbles
R represents the radius of a particular bubble
Sim represents the similarity between the information contained in the two bubbles determined through the cosine similarity.

In addition to this, modifications were made to account for nodes containing area (the bubbles are sized based on importance, as described above) rather than singular points as described in the original Fruchterman-Reingold algorithm, as it is undesirable for the bubbles to overlap. The following pseudocode outlines the method for which the collision detection is performed:

```
function checkCollisions (node currentNode)
{
    for (all the edges connected to the node)
    {
        nextConnectedNode = currentEdge.getNode( );
        if (currentNode and nextConnectedNode overlap);
        {
            move nextConnectedNode away from currentNode;
            checkCollisions(nextConnectedNode);
        }
    }
}
```

This recursive algorithm propagates out from any collision between two bubbles and prevents additional collisions from occurring as it moves overlapping bubbles.

The final steps in the process are to cluster the bubbles so that bubbles containing similar information are colored similarly, and to generate tag words that can identify groups of bubbles. In order to cluster the bubbles, a c-means fuzzy clustering algorithm is used ["FCM: The fuzzy c-means clustering algorithm", Bezdek et al., 1984]. The advantage of this particular algorithm is that it does not break up the bubbles into distinct groups having each bubble either contained or not contained within a cluster, but determines what degree each bubble is in every cluster. The result of this algorithm is that every bubble is assigned a number, or belonging coefficient, that ranges from zero to one, for each cluster which describes how much that bubble belongs to that cluster. After assigning each cluster a random color, the belonging coefficient is used to determine the color of each bubble by creating a weighted sum for each RGB value of the clusters that the bubble belongs to. This is represented by the following formula:

$$Red_b = \sum_{i=0}^{c} w_i * Red_i$$

Where:
$Red_b$ is the red RGB value for the color of the current bubble.
$Red_i$ is the red RGB value for the color of cluster i.
$w_i$ is the belonging coefficient for the bubble within cluster i.
c is the number of clusters.

The number of clusters is usually determined by the rule of thumb, $$c = \sqrt{\frac{n}{2}}$$

Where:
n is the number of bubbles that are in the bubble space
However, there are other, more precise methods of determining c that can be used ["Multivariate analysis", Mardia et al., 1979].

The belonging coefficient generated by the fuzzy clustering algorithm is also used to determine groups that are used for creating tags that can identify the content within a cluster. All the bubbles that have a belonging coefficient of greater than 0.3 are considered within a cluster, and are used to determine the tag word. This number was generated experimentally and could be adjusted depending on the average size of the clusters. For each bubble that falls within this cutoff point, the words that are contained within its respective document are sorted by their tf-idf values and the top 75 words are selected. From these selected words, the one that occurs the most frequently within the other bubbles within the cluster is selected to be the tag for that cluster. In the case of ties in word frequency within the documents of a cluster, the word with a higher tf-idf value is chosen.

The user has the capability to add and remove documents from the bubblespace, and when this is done, the previously described methods are performed once again to determine the new optimized layout of the data set.

Due to the complexity and the slow run time nature of matrix operations, some CPU's (Central Processing Units) may be slow in executing the foregoing algorithmic steps. To overcome this, many of the matrix operations may be relocated to the GPU (Graphics Processing Unit), where a multithreading-oriented architecture allows the highly parallel matrix operations to be completed very quickly (one to two orders of magnitude faster). This holds limitations to old or outdated hardware, as well as hardware without GPUs. While it is unlikely in this day and age that any computing device, mobile or desktop, will not contain this hardware, it is possible to overcome these challenges by offloading these computations to a remote server.

This invention drastically alters the way people browse content on the Internet. Because of this, the invention has the ability to turn into one unified portal which completely caters to its user's browsing needs. In other words, time spent on the Internet could be synonymous with time spent using the disclosed technology. This gives rise to certain approaches to commercialization, e.g., for advertising purposes. If time spent on the Internet equates to time spent in/on the interface of the present disclosure, the portal becomes a fertile ground for advertising. Based on what people search for, interact with, or actively endorse, one could spawn "ad-bubbles". Ad-bubbles are bubbles that convey an advertiser's message, who pay to place such bubbles on the bubblespace. Standard business models that use advertising usually include click-through rates, which measures the number of times an advertisement was interacted with to charge clients. With access to the complete browsing habits of the user, highly targeted advertising can be implemented, fetching a higher price than "spearphishing" advertisement methods. The present disclosure gives rise to the option of re-organizing existing content. Organizing content in a non-linear fashion has applications in almost all existing portals today, including shopping, news, social-media, search-engines, etc., to name a few. The technology of the present disclosure could be used/licensed to render an existing portal as a bubblespace.

Browsing data about users including duration, revisit-frequency, search terms and active sharing are of immense value for advertisement creation and placement. Most existing ventures like Google and Facebook often sell such anonymized data about their users without revealing their identity. A bubblespace that captures the entire browsing habits of its users, would provide valuable marketing insights, providing a complete picture of user behavior, unlike websites, which only have access to user behavior on that specific website.

Figure 3A:
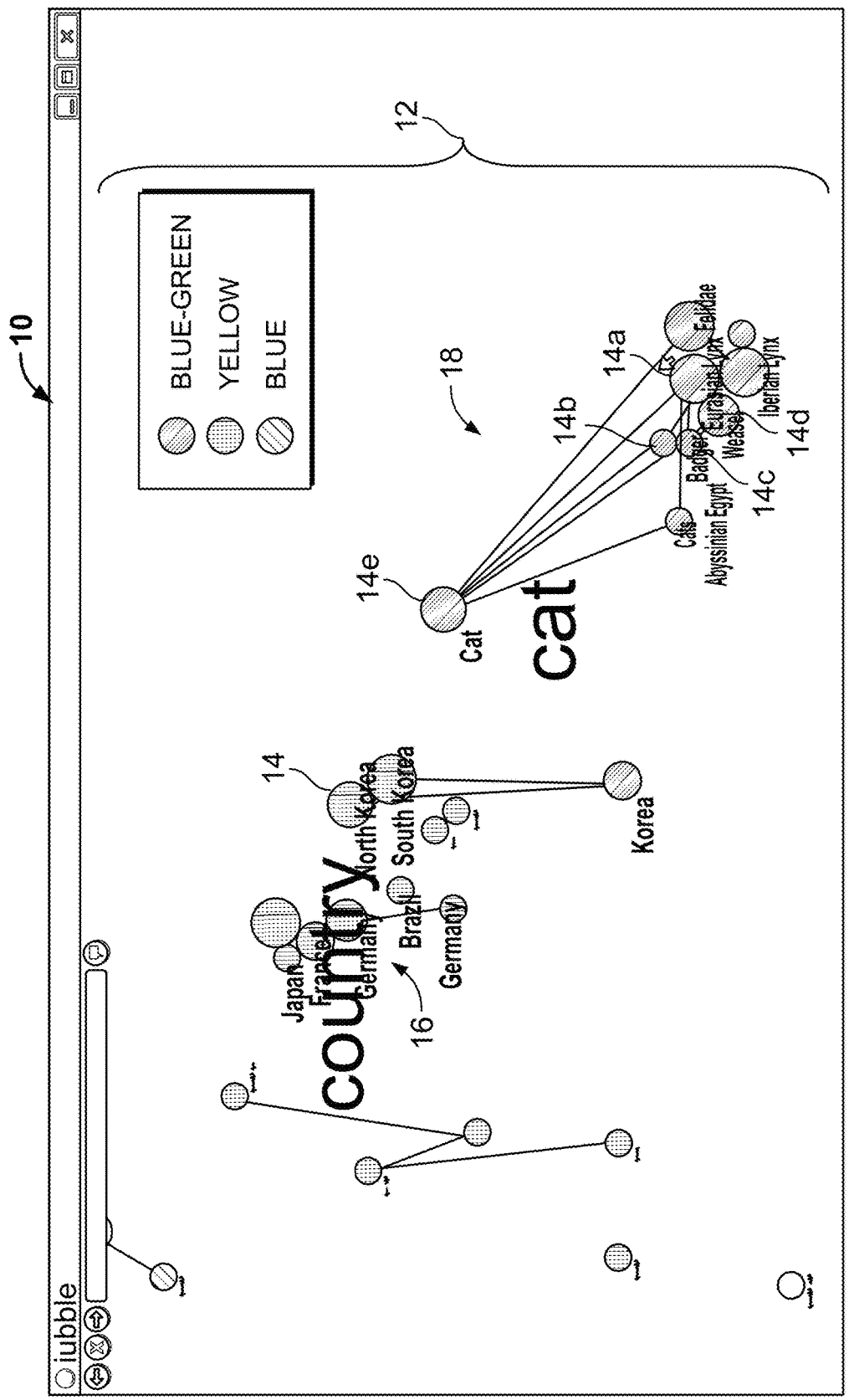
FIGS. 3a-3d are screenshots like FIG. 2, but showing the effect of dragging a bubble.
Figure 3B:
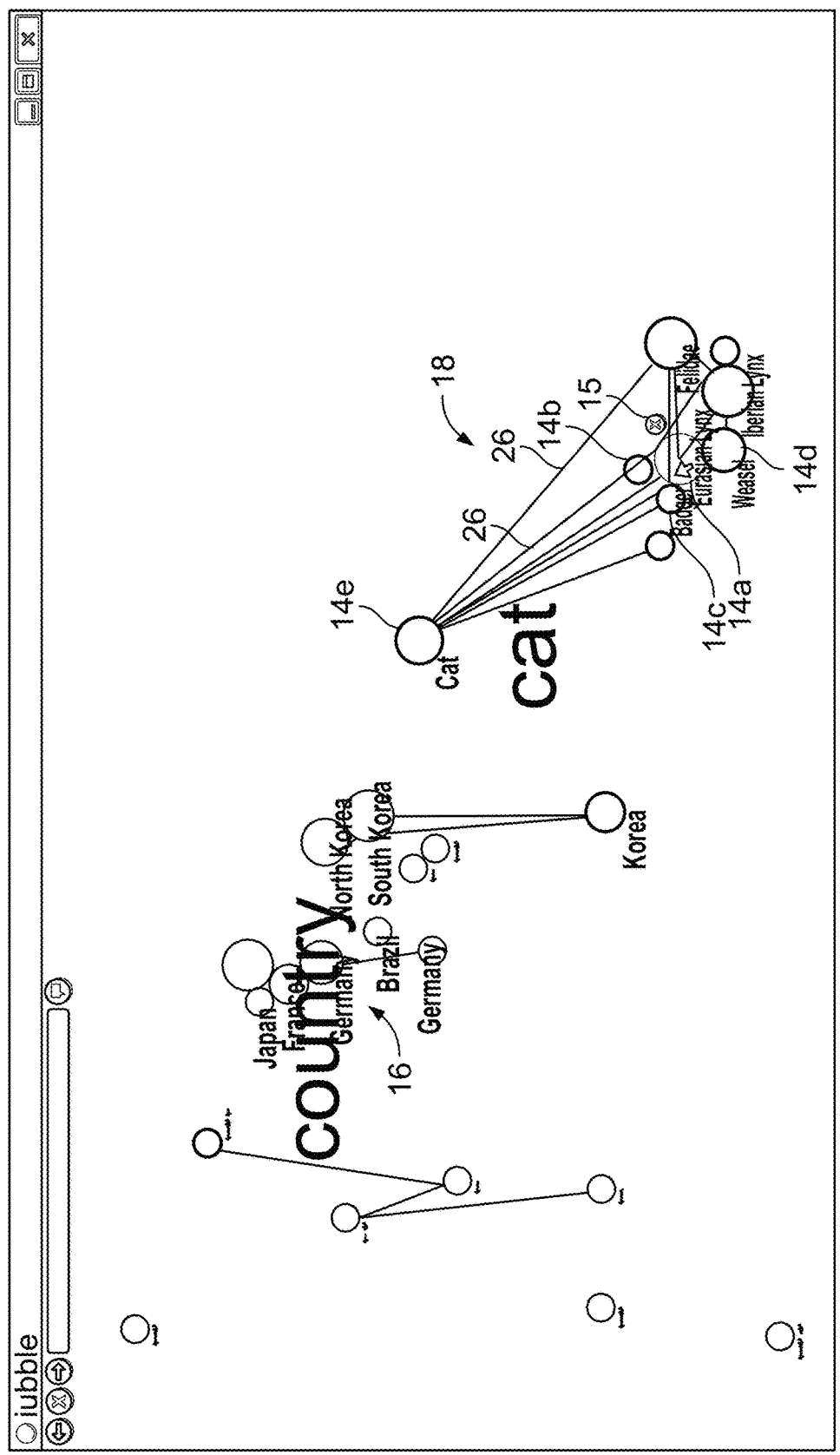
Figure 3C:
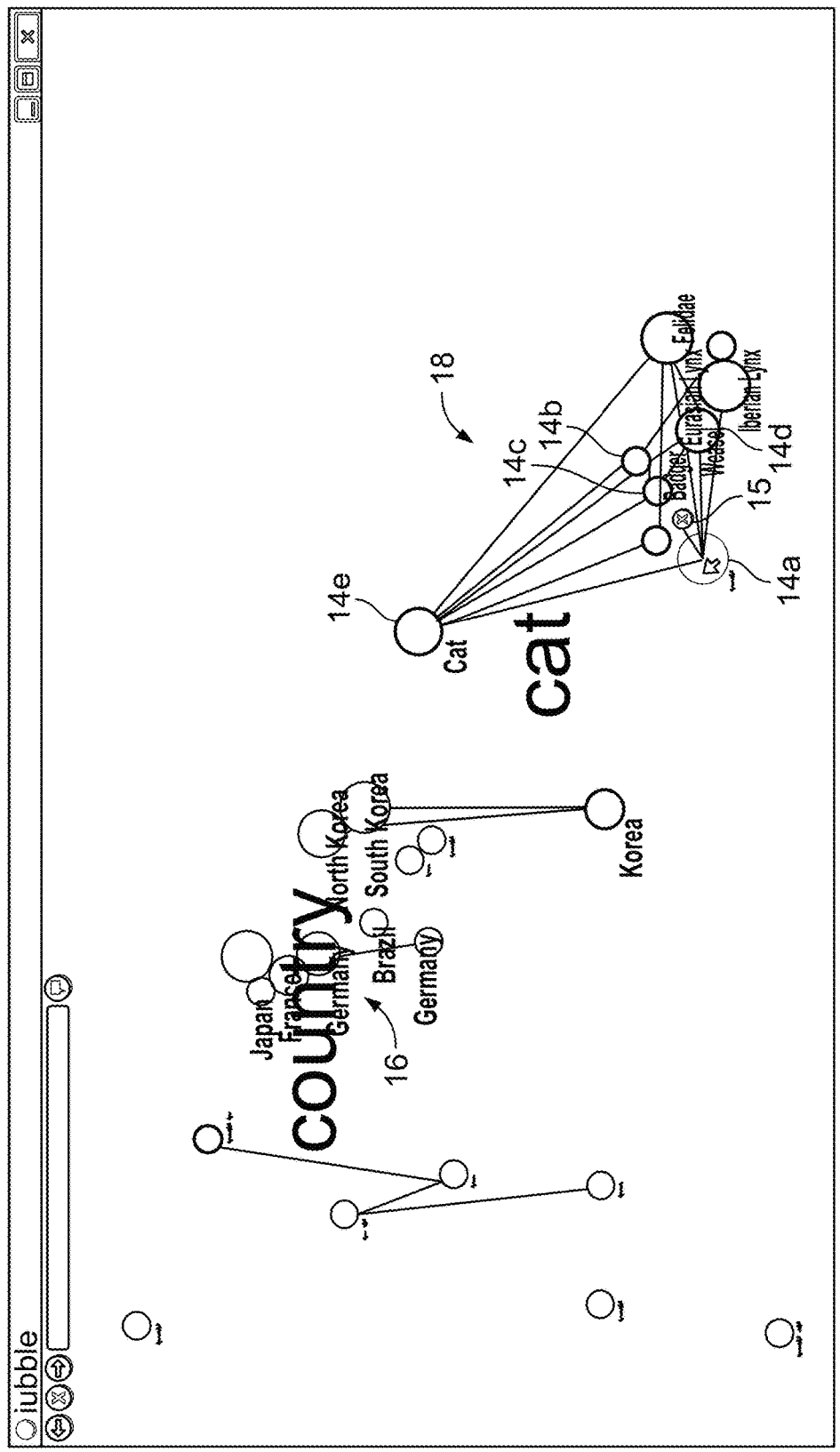

FIG. I shows a computing device 5 with a display 10 (screen shot) presenting a bubblespace 12 of a plurality of bubbles 14. The computing device 5 may be a mainframe, server, desktop computer, laptop, tablet, PDA, cell phone, or any other commonly available computing devices. The computing device 5 is programmed as described above and may be connected to the Internet 1 wirelessly or by a hard-wired connection. When the computing device is programmed to present data represented by a bubblepsace 12 with bubbles 14, etc., as further described herein, the programmed computer may be referred to as a system. The computer 5 typically has access to data storage DS, e.g., in the form of thumb drives, hard disk drives, removable disk drives, etc., on which voluminous data sets may be stored. A bubblespace 12 can be described as a view on a set of bubbles 14 at a given scale or % zoom ranging from the lowest scale and % zoom of viewing and showing the entire universe of data to the highest scale and % zoom. The bubbles 14 are representative of associated data, e.g., data available on the Internet at websites or files stored in mass storage, e.g., on data storage device DS. While the present disclosure utilizes examples of data accessed from/through the Internet, the present disclosure is applicable to representing and accessing any data, wherever it may be to stored and by whatever means it may be retrieved. As described above, the bubbles 14 may be grouped into identifiable groups 16, 18 and colored based upon similarity of data content, as well as labeled with labels 20 derived from that content. The groups 16, 18 may also be labeled by labels 22, 24, in a similar way. The similarity between bubbles 14 may be illustrated by proximity and color. FIGS. 1 and 3a illustrate the color of bubbles 14 with cross-hatching. For simplicity of illustration, the cross-hatching is not shown in the remainder of the figures, but the same coloration techniques are applicable to the remainder of the figures. In addition or alternatively, the system of the present disclosure provides the user with the option to turn on "connection drawing" mode. When enabled, semi-transparent lines 26, whose widths vary proportionally to the quantitative similarity between a given pair of bubbles 14 that are connected by the lines 26, are drawn. The bubbles 14 may be "dragged," e.g., by mouse movement or finger/stylus movement on a touchscreen. The bubbles 14 may be dragged to impose a user-defined organization and spatial positioning on the bubbles 14 displayed. As shown in FIGS. 3a-3d, the lines 26 move with the bubbles 14, growing, shrinking, and changing angular orientation as the bubbles 14 are moved.

Figure 2:
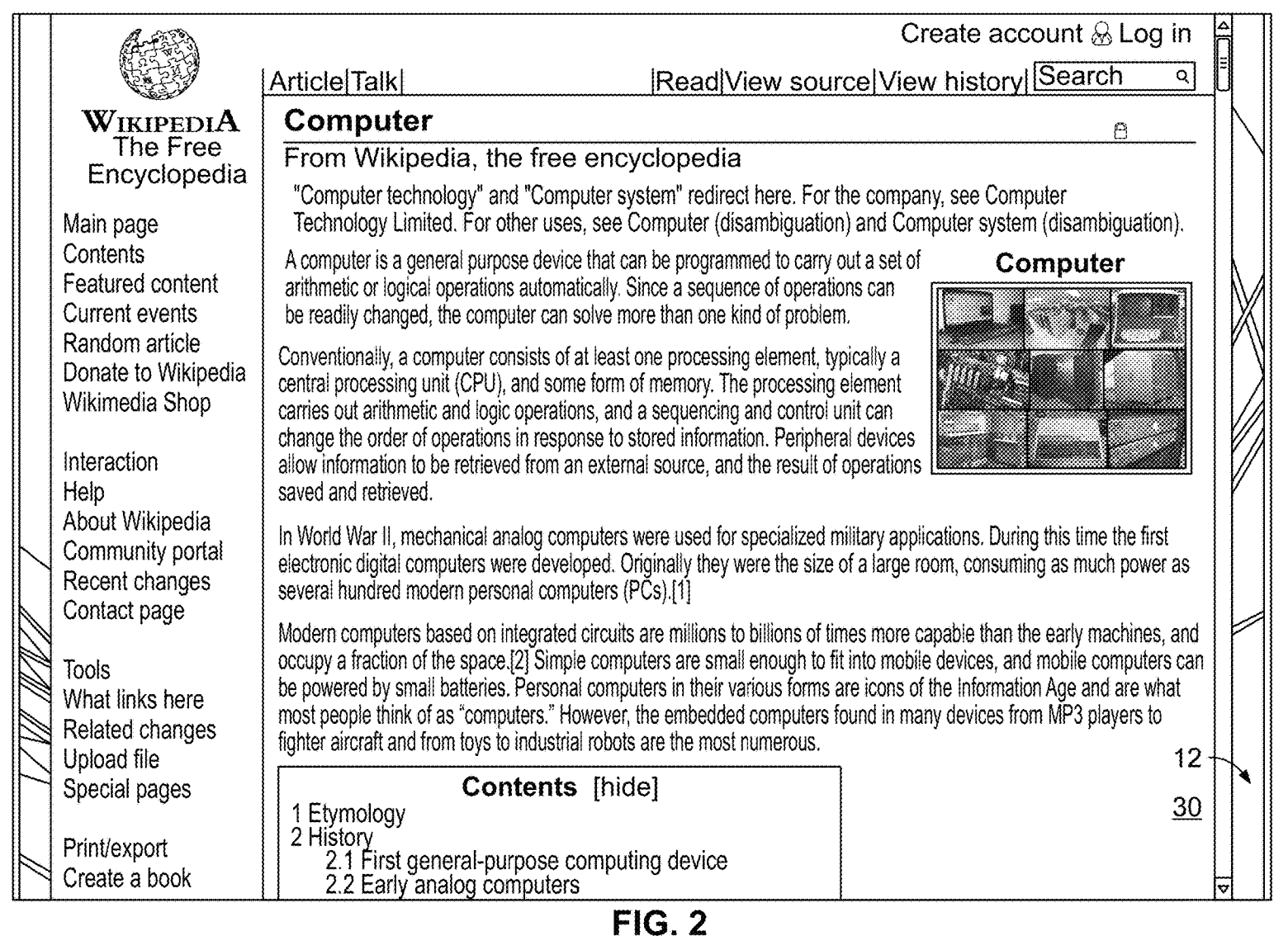

FIG. 2 shows a sample webpage 30 having data content that is presented to the user upon double-clicking a bubble 14 (See FIG. 1) with which the webpage is associated. In this respect, the bubble 14 functions as a hyperlink. New bubbles 14 may be generated by visiting a website or entering a URL to gain access to a website. In this way, the display of a webpage/visiting a website gives the user the ability to impact the bubblespace, i.e., by creating new bubbles. When a link on a displayed web page is clicked, a new bubble 14 representing that link is placed in the bubblespace and the new bubble 14 is clustered with the pre-existing bubbles 14. The display of the bubblespace 12 persists "behind" the displayed webpage 30, i.e., in the area of the display screen that is not occupied by the webpage 30 and is operational if selected by pointing and clicking or by selection on a touch screen. In the example shown, only a small portion of bubblespace 12 is visible but more could be shown by resizing or repositioning the webpage 30 displayed.

Figure 3D:
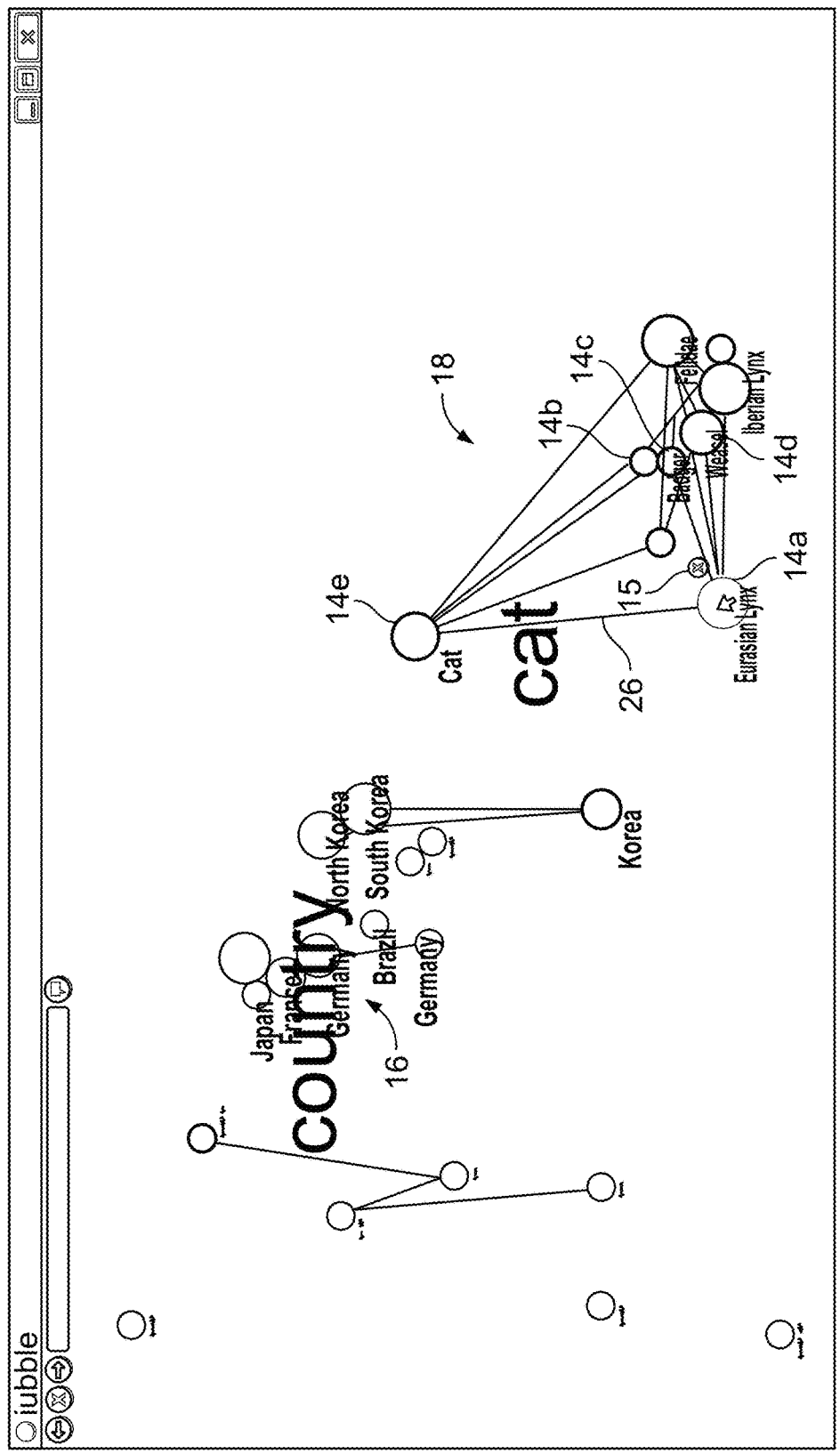

FIGS. 3a-3d show the dragging of a bubble 14a from its original position in FIG. 3a to a final (dropped) position in FIG. 3d. As can be appreciated from the sequence of figures, the other bubbles, e.g., 14b, 14c and 14d react to the movement of bubble 14a, and are displaced from their original positions in order to permit the bubble 14a to be moved to its final position. The lines 26 connecting the bubbles, e.g., 14a to 14e, self-adjust in order to maintain the connection. These same dynamics would apply in the event that a user selected multiple bubbles to move (drag). When a bubble 14 or group of bubbles, e.g., 16, 18 is selected, e.g., by a mouse cursor and right clicking, while the mouse is hovering over the bubble, a "pop" option icon 15 appears. Clicking on the icon 15 causes the bubble to "pop," deleting the bubble 14. This action also extends to groups of selected bubbles 16, 18.

Figure 4:
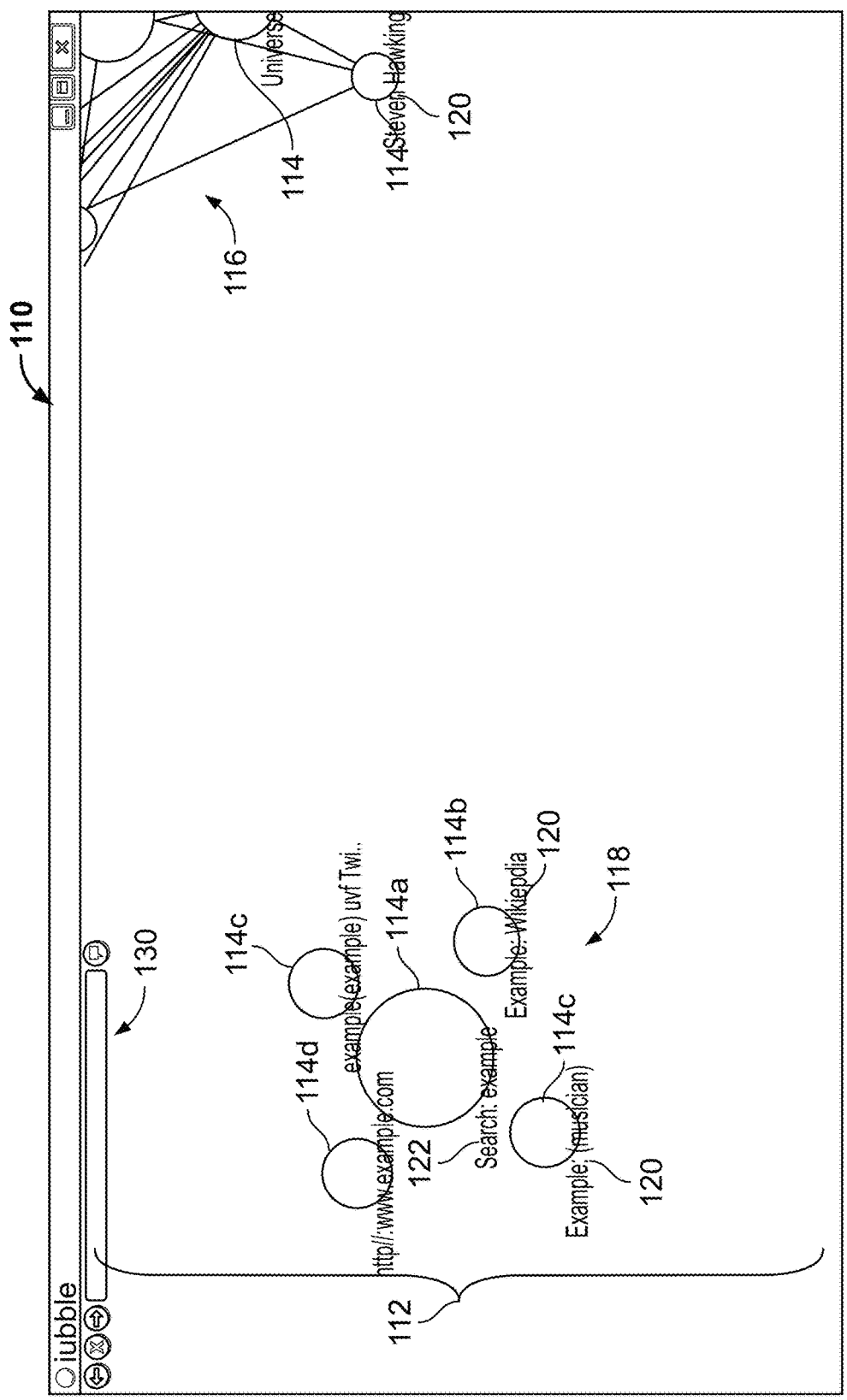
FIG. 4 is a screenshot generated in accordance with another aspect of the present disclosure.

FIG. 4 shows a display 110 (screen shot) presenting a bubblespace 112 of a plurality of bubbles 114 at a given % zoom of viewing which shows less than the all the bubbles 114 representing the universe of data. The bubbles 114 are representative of associated data, e.g., data available on the Internet at websites or files stored in mass storage. The bubbles 114 are grouped into identifiable groups 116, 118 and assigned a color based upon similarity of data content, sized (scaled) based upon importance, and labeled with labels 120 derived from data content. The groups 116, 118 are also labeled by labels 122, in a similar way. The scaling of bubbles 14 based upon importance and the capability of zooming both convey a 3D effect, e.g., in a similar manner as the representation of closer objects as larger in a picture or drawing.

The top of the screen 110 features a navigation bar 130 that identifies a search engine and search terms. In the instance shown, "Google" is the search engine selected and the search term is "example." The filling of the navigation bar enables search mode, which is indicated by the blue box surrounding the search provider. When the user hits "Enter," the selected search provider is queried for the search term, and result URLs are collected. The bubble 114a is generated representing the search page and is surrounded by bubbles 114b-114e representing the search results. Each of the bubbles 114a-114e were automatically generated and stored by the system of the present disclosure upon initiating the Google search for "example." The bubbles 114a-114e display the attributes and are subject to the operations as described above relative to bubbles 14.

Figure 5:
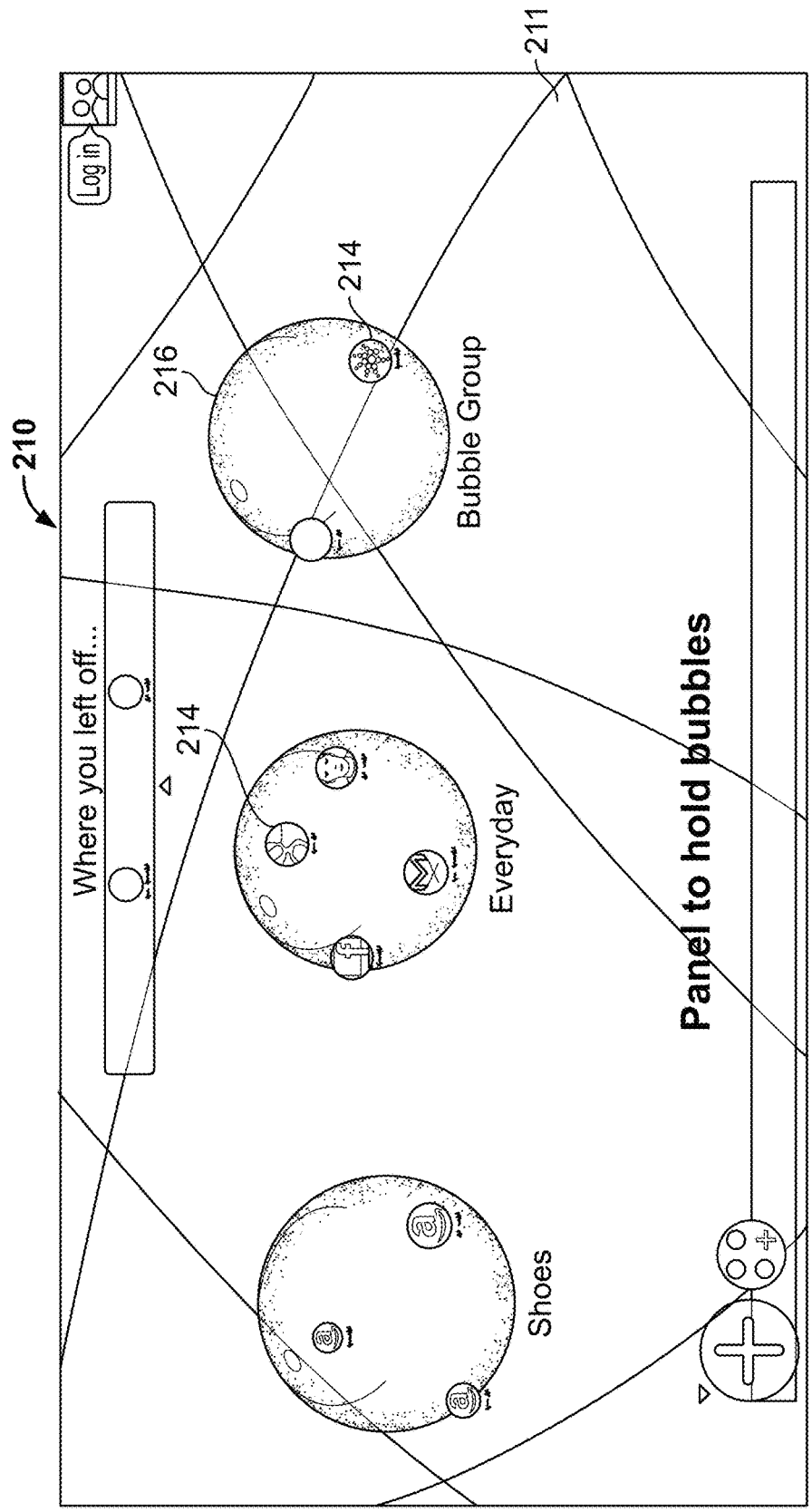

FIG. 5 is a screenshot of a display 210 having a panel 211 that holds bubbles 214 that are being interacted with by the user. As can be appreciated, a bubble group 216 (bubble space) can be graphically represented by a larger bubble, which contains the smaller bubbles 214. The related symbols, e.g., bubbles 214 organized as a group 216 may be designated a "bubblespace." The term "bubblespace" may also be applied to the display space (panel 211) that holds multiple bubble groups 216. The user can interact with the bubbles 214 and bubble groups 216 by dragging and repositioning them on the panel 211 and may add and delete bubbles 214, either to the panel 211 or to a selected bubble group 216. A user can drag a bubble 214 from one group 216 to another group 216, thereby removing the symbol from the former group and adding it to the latter. Optionally, the user can spawn new groups 216 to organize bubbles 214 at will. Optionally, the user can drag bubbles 214 from an existing group 216 or from a previous session, to form new groups 216.

Figure 6:
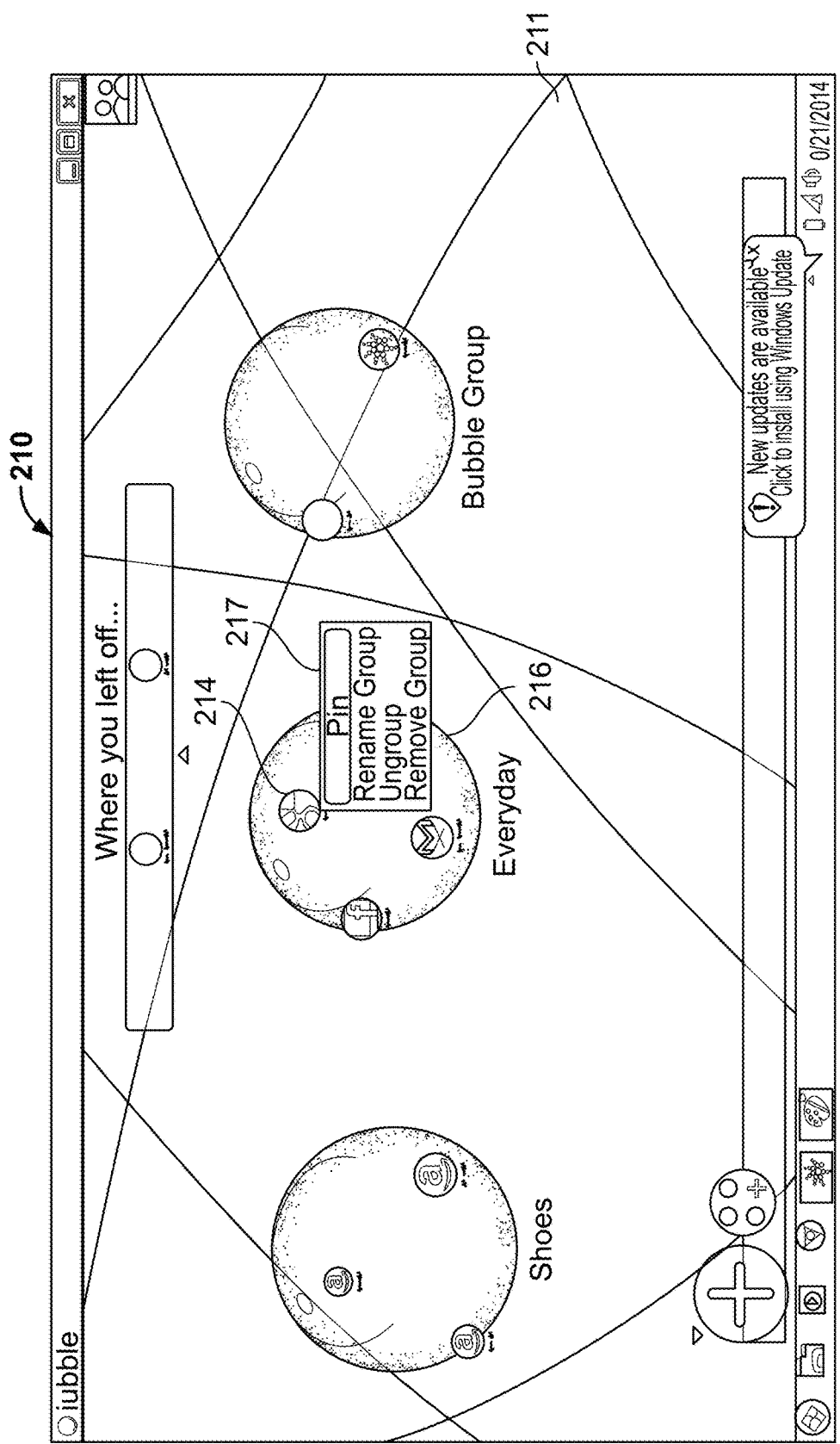
FIG. 6 is a screenshot of the action of pinning a bubble.

FIG. 6 is a screenshot of display 210 in the course of a user "pinning" a bubble group 216 labeled "Everyday," as indicated by the menu 217 onto the panel 211. When pinning is invoked by clicking on the "Pin" option in the menu 217, the bubbles 214 within the "Everyday" bubble group 216 are loaded to the panel 211. Once loaded, the bubbles 214 and their content can be interacted with.

Figure 7:
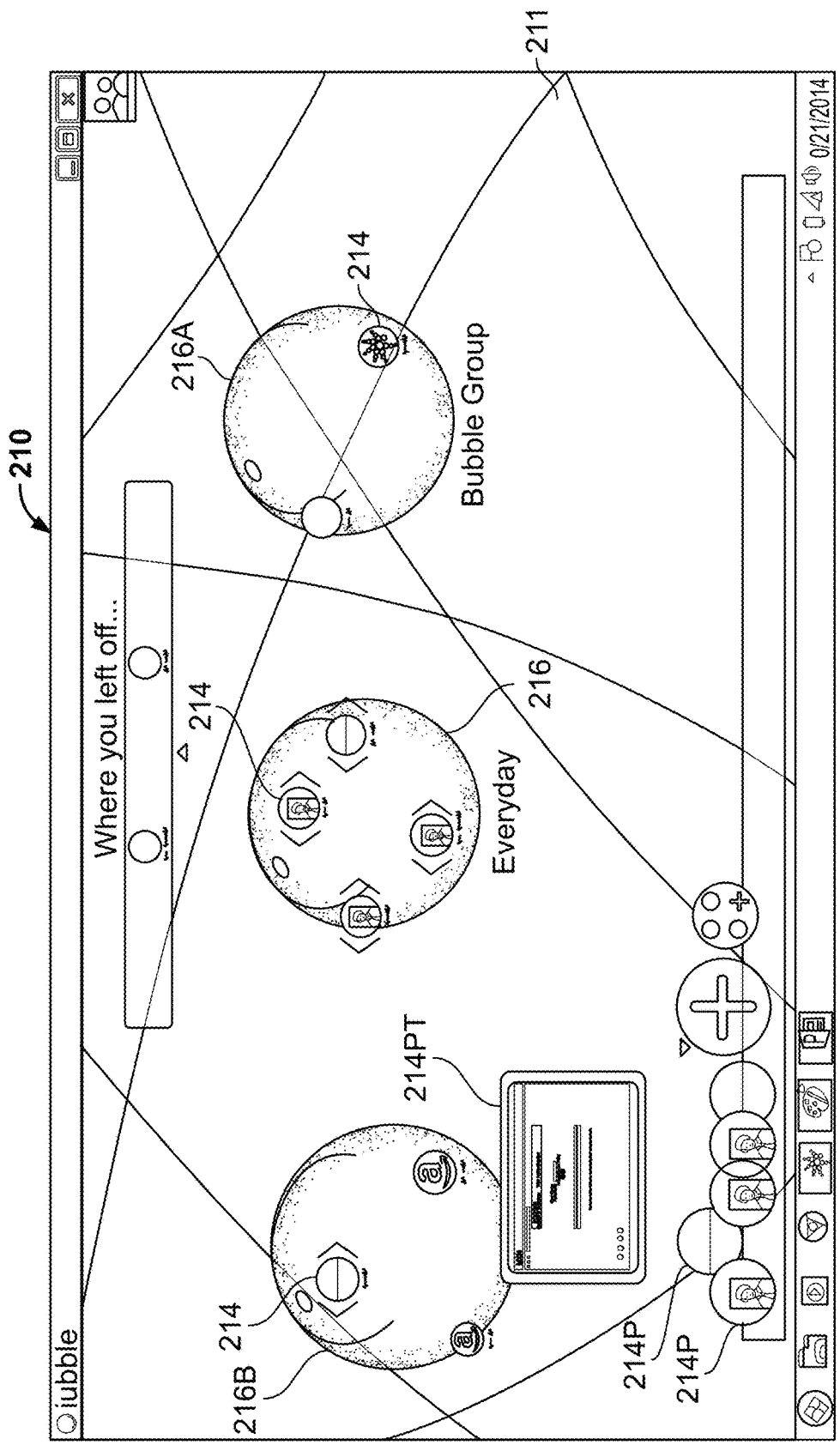
FIG. 7 is a screenshot of user interaction with bubbles in a panel.

FIG. 7 shows the result of pinning the "Everyday" bubble group 216 to the panel 211. More particularly, the loaded bubbles 214 of bubble group 216 are shown at the bottom left corner of the panel 211, viz., as bubbles 214P. The panel 211 allows visualization and can hold bubbles 214 currently interacted with. Users can inspect the contents of a bubble 214P by clicking on it, or inspecting a thumbnail view 214PT of the contents. A user may also drag, re-arrange, add to an existing bubble space or delete a bubble 214P. The bubblespace 216 may also be expanded and collapsed into various views. In an alternative approach, a symbol or bubble 214 can be loaded onto the panel 211 by means of interaction. Optionally, an entire bubble-space 216 or group of bubbles 214 can be simultaneously loaded onto the panel 211. Optionally, interaction can switch between a group 216 of currently loaded bubbles 214P to another group 216A or 216B of separate bubbles 214 in one interaction. Optionally, the system 5 allows users to spawn new data points, or bubbles 214, at will to interact with new content.

Figure 8:
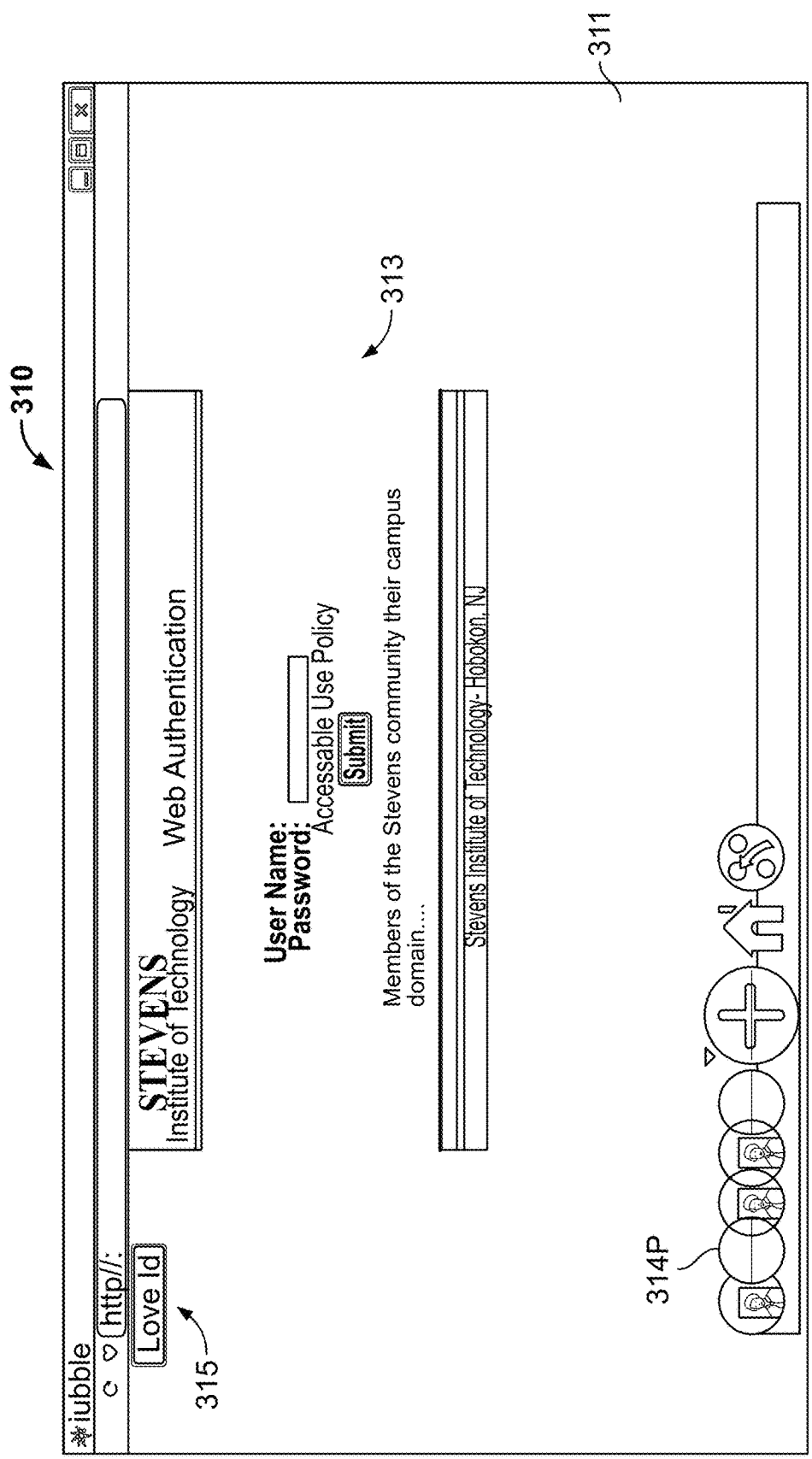
FIG. 8 is a screenshot illustrating a user's expression of explicit liking for content.

FIG. 8 is a screenshot that illustrates a display 310 showing bubble content 313 that is shown when a bubble 314P is clicked on when interacting with the bubble 314P in the panel 311. When the bubble content 313 is displayed, the user is presented with the option of indicating explicit inclination to that content by clicking on the "love" content symbol 315, whereupon this status of "loved" content is stored in association with the bubble 314P. Alternatively, the system 5 reorganizes symbols (bubbles 14, 114, 214, 314P) to make apparent content that a user likes. This may be done via color coding bubbles, sizing bubbles or bubble placement, as described above.

In one embodiment, the system 5 maintains information about various "sessions". A session is the sequence of activities performed from the time a user starts interacting with the program until the user quits the program. Optionally, the system 5 maintains continuity between sessions and may present activities from the previous session to the user upon restart. In one embodiment, a collection of symbols (bubbles 214) from the previous session is presented as a new group 216 that is made visible to the user. It will be understood that the embodiments described herein are merely exemplary and that a person skilled in the art may make many variations and modifications without departing from the spirit and scope of the claimed subject matter. All such variations and modifications are intended to be included within the scope of the claims.

We claim:

1. An apparatus for accessing and controlling data, comprising:
a computer coupled to a display screen and to a source of a plurality of data items having a given associated data content, the computer programmed with a program having a graphical user interface that displays symbols on the display screen that represent the data items, the computer automatically and dynamically calculating the quantified similarity between the data content of the plurality of data items when the data content of each of the plurality of data items is accessed and expressing the quantified similarity by the symbols on the display screen.

2. The apparatus of claim 1, wherein the symbols are displayed in groups based upon the quantified similarity of content of the data that the symbols represent.

3. The apparatus of claim 2, wherein symbols are automatically named based upon the content of the associated data.

4. The apparatus of claim 2, wherein groups of symbols are automatically named based upon the content of the associated data.

5. The apparatus of claim 1, further including lines extending between symbols, the lines graphically indicating the relatedness of the data that the symbols represent.

6. The apparatus of claim 5, wherein the relatedness indicated by the lines is shown by the thickness of the lines.

7. The apparatus of claim 1, wherein the source of the data items is the Internet and wherein the symbols are used as a graphical user interface for a browser, each symbol functioning as a hyperlink selectable to invoke entry of a URL associated with the data item into the browser and invoking the URL causing the display of the data present at the URL on the display screen.

8. The apparatus of claim 7, wherein the symbols are automatically generated by the program on each entry of a URL of a website on the Internet.

9. The apparatus of claim 7, wherein the symbols are automatically generated by the program on selection of a hyperlink.

10. The apparatus of claim 7, wherein the data items are obtained from websites on the Internet and the associated data content is content present on the websites.

11. The apparatus of claim 7, wherein the data items are obtained from a data server on the Internet.

12. The apparatus of claim 1, wherein the data items are obtained from a data server on a local area network (LAN) or a wide area network (WAN).

13. The apparatus of claim 1, wherein the data items are obtained from a mass storage device without the need to connect to a network, such as internal or external hard disc drives, memory, compact disc drives, or universal serial bus (USB) drives.

14. The apparatus of claim 1, wherein the number of uses of a given data item is represented at least partially by the size of the symbol.

15. The apparatus of claim 1, wherein the relevance to the user's interests of a given data item is represented at least partially by the size of the symbol.

16. The apparatus of claim 1, wherein the relative importance to the user based on temporal or spatial locality observed from browsing patterns is represented at least partially by the size of the symbol.

17. The apparatus of claim 1, wherein symbols can be selected and the data associated with a given symbol is displayed in response to the selection.

18. The apparatus of claim 1, wherein symbols can be dragged and dropped to adjust the display of symbols to a user's preferences.

19. The apparatus of claim 1, wherein the symbols are in the form of bubbles.

20. The apparatus of claim 1, wherein the symbols can be viewed at a plurality of levels of magnification (zoom).

21. The apparatus of claim 20, wherein the plurality of magnification levels implies a variable displacement of the symbols relative to the plane of the display, representing a third dimension.

22. The apparatus of claim 1, wherein the relatedness of given data items is represented at least partially by the colors of the symbols that represent them.

23. The apparatus of claim 1, wherein the quantified similarity between the plurality of data items is determined by Latent Semantic Analysis resulting in a number from −1 to 1 representative of similarity of data content of a first data item to data content of a second data item of the plurality of data items.

24. The apparatus of claim 1, wherein the symbols can be deleted by the user.

25. The apparatus of claim 1, wherein the symbols may be displayed at different sizes implying a variable displacement of the symbols relative to the plane of the display, representing a third dimension.

26. A method for representing data in a graphical user interface displayed to a user on a display screen of a computing device with access to a plurality of data items having an associated data content, comprising:
displaying graphical symbols on the display screen that represent the data items accessed by a user, the symbols being displayed in groups based upon a grouping criteria, including at least one of quantified similarity of content of the data that the symbols represent, categorization by the user and viewing by the viewer in a prior session of use of the computing device;

clustering data items based upon quantified similarity of data content, the relationship of the groups of data items being expressed by at least one of lines between the symbols, coloration of the symbols and a grouping symbol having a boundary extending around the symbols in a group;

automatically naming the symbols and groups of symbols, the naming of the groups of symbols based upon frequency of occurrence of text in data item content;

displaying the name of the symbols and groups of symbols proximate the symbols and groups of symbols, respectively;

ranking the symbols; and expressing the rank of the symbols and the data that they represent based upon a ranking criteria of at least one of frequency of access and ascribed importance by the user, the ranking of symbols capable of being expressed graphically by at least one of size of the symbol, position of the symbol and color of the symbol, the graphical user interface capable of presenting data content associated with a symbol of the plurality of symbols upon selection of the symbol by the user.

27. The method of claim 26, wherein the method includes providing the user with the capability of selectively dragging and dropping symbols to positions on the display in accordance with the user's preferences, including dragging a symbol from one group and dropping the symbol in another group, dragging and dropping groups of symbols, adding and deleting symbols and groups of symbols, viewing thumbnail representations of data associated with symbols, and wherein the symbols represent data items that are obtained from websites on the Internet, the symbols being automatically generated, named and displayed on the graphical user interface when accessing a website on the Internet and wherein the symbols are used as a graphical user interface for a browser, each symbol functioning as a hyperlink, selectable to invoke entry of a URL corresponding to the data item into the browser and invoking the URL causing the display of the data present at the URL associated with the symbol on the display screen.

28. A graphical user interface displayed to a user on a display screen of a computing device coupled to a source of a plurality of data items, comprising:

a plurality of symbols displayed on the display screen that represent a plurality of data items, the symbols capable of being displayed in groups based upon a grouping criteria, including at least one of quantified similarity expressed as a number from −1 to 1 representative of similarity of content of the data that the symbols represent, categorization by the user and viewing by the viewer in a prior session of use of the computing device, the relationship of the groups of data items being expressed by at least one of lines between the symbols, coloration of the symbols and a grouping symbol having a boundary extending around the symbols in a group;

the symbols and groups of symbols having names displayed proximate the symbols and groups of symbols, the names of groups of symbols automatically determined based upon frequency of the names in data content of the groups of data items associated with the groups of symbols, allowing a user to identify the data associated with the symbols and groups of symbols, the symbols having a ranking based upon a ranking criteria of at least one of frequency of access and ascribed importance by the user, the ranking of symbols capable of being expressed graphically by at least one of size of the symbol, position of the symbol and color of the symbol, the graphical user interface capable of presenting data content associated with a symbol of the plurality of symbols upon selection of the symbol by the user, the graphical user interface providing the user with the capability of selectively dragging and dropping symbols to positions on the display in accordance with the user's preferences, including dragging a symbol from one group and dropping the symbol in another group, dragging and dropping groups of symbols, adding and deleting symbols and groups of symbols, viewing thumbnail representations of data associated with symbols, the symbols representing data items and being automatically generated, named and displayed on the graphical user interface when accessing the data item.

* * * * *